US012655049B2

(12) United States Patent
Park et al.

(10) Patent No.: US 12,655,049 B2
(45) Date of Patent: Jun. 16, 2026

(54) SYSTEM AND METHOD FOR CULTIVATION OF OXYGENIC PHOTOGRANULE

(71) Applicant: University of Massachusetts, Boston, MA (US)

(72) Inventors: Chul Park, Amherst, MA (US); Joseph G. Gikonyo, Belchertown, MA (US); Ahmed S. Abouhend, Amherst, MA (US)

(73) Assignee: University of Massachusetts, Westborough, MA (US)

( * ) Notice: Subject to any disclaimer, the term of this patent is extended or adjusted under 35 U.S.C. 154(b) by 451 days.

(21) Appl. No.: 18/324,328

(22) Filed: May 26, 2023

(65) Prior Publication Data

US 2023/0382774 A1      Nov. 30, 2023

Related U.S. Application Data

(60) Provisional application No. 63/365,347, filed on May 26, 2022.

(51) Int. Cl.
| | |
|---|---|
| *C02F 3/32* | (2023.01) |
| *C02F 3/12* | (2023.01) |
| *C02F 3/00* | (2023.01) |

(52) U.S. Cl.
CPC ............ *C02F 3/322* (2013.01); *C02F 3/1284* (2013.01); *C02F 2003/001* (2013.01); *C02F 2203/004* (2013.01); *C02F 2305/06* (2013.01)

(58) Field of Classification Search
CPC .. C02F 3/322; C02F 3/1284; C02F 2003/001; C02F 2203/004; C02F 2305/06
(Continued)

(56) References Cited

U.S. PATENT DOCUMENTS

| | | | |
|---|---|---|---|
| 10,189,732 B2 | 1/2019 | Park et al. | |
| 2003/0213745 A1* | 11/2003 | Haerther | C02F 3/32 |
| | | | 210/602 |

(Continued)

FOREIGN PATENT DOCUMENTS

| | | |
|---|---|---|
| CN | 214880538 | 11/2021 |
| WO | 2022120376 | 6/2022 |
| WO | 2023230364 | 11/2023 |

OTHER PUBLICATIONS

Yan et al., Continuous flow reactors for cultivating aerobic granular sludge: configuration innovation, principle and research prospect, Wiley Online Library, (May 26, 2021), pp. 2721-2734.*

(Continued)

*Primary Examiner* — Fred Prince
(74) *Attorney, Agent, or Firm* — Schwegman Lundberg & Woessner, P.A.

(57) ABSTRACT

A method comprises flowing a mixture comprising a water-based reaction medium and at least one microalgae into a reaction vessel, wherein the reaction medium comprises a nutrient material that is consumable by a live microalgae, bacterium, or protozoa present in the reaction medium, incubating the mixture under at least intermittent illumination with a specified luminous flux such that the microalgae forms a supporting matrix that incorporates the live microalgae, bacterium, or protozoa into biologically-active bioaggregate granules, selecting out a first specified portion of the biologically-active bioaggregate granules that are smaller than a first specified size or below a first specified weight or selecting out a second specified portion of the biologically-active bioaggregate granules that are larger than a second specified size or over a second specified weight and remov- (Continued)

ing the first and/or the second specified portions of the biologically-active bioaggregate granules in an effluent stream.

21 Claims, 12 Drawing Sheets

(58) Field of Classification Search
    USPC ................ 210/602, 610, 611, 615, 616, 617
    See application file for complete search history.

(56) References Cited

U.S. PATENT DOCUMENTS

2005/0269259 A1* 12/2005 Dunlop ..................... C02F 1/30
                                                              210/194
2013/0334132 A1* 12/2013 Calhoun ................. C02F 3/303
                                                              210/602
2016/0318782 A1    11/2016 Park et al.

OTHER PUBLICATIONS

"International Application Serial No. PCT US2023 023769, International Search Report mailed Aug. 22, 2023", 3 pgs.
"International Application Serial No. PCT US2023 023769, Written Opinion mailed Aug. 22, 2023", 5 pgs.
Abouhend, A., "Growth Progression of Oxygenic Photogranules and Its Impact on Bioactivity for Aeration-Free Wastewater Treat-ment", Environmental Science and Technology, 54, 1, 486-496, 2020., (Dec. 2, 2019), 12 pgs.
Ansari, A., "Photogranulation in a hydrostatic environment occurs with limitation of iron", Environmental Science and Technology, 55, 15, 10672-10683, 2021., (Jul. 13, 2021), 12 pgs.
Gikonyo, J.G., "In vivo evaluation of oxygenic photogranules photosynthetic capacity by pulse amplitude modulation and phototrophic irradiance curves", ACS ESandT Engineering 1,3, 551-61, 2021., (2021), 12 pgs.
Gikonyo, J.G., "Hydrodynamic granulation of oxygenic photogranules", Environmental Science: Water Research and Technology 7, 427-40, 2021., (2021), 35 pgs.
Gikonyo,, J.G., "Scaling up of Oxygenic Photogranular System in Selective CSTR", Bioresource Technology Reports, BITEB D 23 00380, (Sep. 2023), 15 pgs.
Park, C., "Unmasking photogranulation in decreasing glacial albedo and net autotrophic wastewater treatment", Environmental Micro-biology, 2021., https: doi.org 10.1111 1462-2920.15780, (Sep. 16, 2021), 14 pgs.
Yan, Jin-Lei, "Continuous flow reactors for cultivating aerobic granular sludge: configuration innovation, principle and research prospect, principle and research prospect" Journal of Chemical Technology and Biotechnology, vol. 96, Issue 10, [Online] Retrieved from the internet:https: onlinelibrary.wiley.com doi abs 10.1002 jctb.6791, (Oct. 2021), 20 pgs.
"International Application Serial No. PCT US2023 023769, International Preliminary Report on Patentability mailed Dec. 5, 2024", 7 pgs.

* cited by examiner

FIG. 7M                    FIG. 7N

SYSTEM AND METHOD FOR CULTIVATION OF OXYGENIC PHOTOGRANULE

CROSS-REFERENCE TO RELATED APPLICATION

This application claims priority under 35 U.S.C. § 119(e) to U.S. Provisional Application Ser. No. 63/365,347, filed on May 26, 2022, entitled "SYSTEM AND METHOD FOR CULTIVATION OF OXYGENIC PHOTOGRANULES," the disclosure of which is incorporated herein by reference in its entirety.

BACKGROUND

Wastewater treatment is an energy-intensive procedure, in particular for aerobic wastewater treatment to remove sewage organic matter, which requires a substantial energy input to aerate the wastewater in order to dissolve oxygen gas ($O_2$). It is typical in the United States for wastewater treatment takes up as much as one-third of the total energy usage for many municipalities. Of this energy usage, about 60% is dedicated to wastewater aeration to support aerobic oxidation of organic matter and nitrogen. The high energy cost for aeration is an ongoing burden in high-income communities and can become a barrier for implementation into mid-income and low-income communities. The aerobic process typically involves the growth of floc-based biomass in large sedimentation basins to separate the biomass from water, which requires substantial capital investment. In addition to these operating and capital costs, conventional aerobic wastewater treatment releases carbon dioxide gas ($CO_2$) to the atmosphere during treatment.

Algae-based wastewater treatment has been gaining acceptance as an alternative to conventional wastewater treatment practices because it has the potential to treat wastewater without requiring energy-intensive aeration through the symbiotic growth of microbes and oxygenic photosynthetic microalgae. With effective biomass separation, algae-based wastewater treatment may also be able to further reduce operational costs and capital investment. This type of wastewater treatment is also able to preserve the chemical energy within the wastewater in the form of grown biomass. A successful microalgae process could substantially reduce energy usage for wastewater treatment and could enhance recovery of chemical energy and solar energy from the wastewater by means of photoautotrophic assimilation of $CO_2$.

However, engineering challenges limit the adoption of microalgae processes. For example, photosynthetic microalgae do not typically naturally aggregate, which can make it difficult to separate the microalgae from the wastewater reaction medium, which can make biomass recycling and harvesting difficult. In addition, it can be challenging to configure a reactor system to produce sufficient amounts of the symbiotic microbes and oxygenic phototrophs for large-scale wastewater treatment within a reasonably short period of time. For example, the microalgae's need for light for photosynthesis has made only certain reactor configurations, such as large open ponds or photobioreactors, useful for microalgae processes. However, these types of reactors are impractical for economically-viable industrial use, especially for municipal wastewater treatment.

SUMMARY

The present disclosure describes systems and methods for cultivating oxygenic biologically-active bioaggregate granules that can be used for wastewater treatment. The systems and methods described herein can be readily incorporated into conventional wastewater treatment tanks and vessels, such that the systems and methods of the present disclosure are suitable for both main-stream and side-stream treatment at wastewater treatment plants.

The systems and methods described herein include the use of continuous-flow cultivation of the oxygenic biologically-active bioaggregate granules with hydraulic selective and hydrodynamic shear pressures to promote the formation of the granules comprising phototrophic and non-phototrophic microorganisms. Growth of these microbes in granular morphology allows for good light penetration in the reaction medium, facilitating the photosynthetic process. The systems and methods of the present disclosure can use conventional continuous-flow reactors used in wastewater treatment such that the specialized reactor types typically required for phototrophic processes are not needed. The systems and methods of the present disclosure enable the use of microbial phototrophic processes for wastewater treatment at industrial scale, especially for municipal wastewater treatment.

According to one aspect of the present disclosure, a method of cultivating oxygenic biologically-active bioaggregate granules is described. In an example, the method of biologically-active bioaggregate granule cultivation includes flowing a mixture comprising a water-based reaction medium and at least one microalgae into a reaction vessel at a continuous or substantially continuous flow rate, wherein the water-based reaction medium comprising a nutrient material that is consumable by a live microalgae, by a live bacterium, or by a live protozoa present in the water-based reaction medium, incubating the mixture in the reaction vessel under at least intermittent illumination with a specified luminous flux during periods of illumination while mixing said mixture under a specified shear stress such that the microalgae forms a supporting matrix that incorporates said live bacterium or said live protozoa into a biologically-active bioaggregate granule, wherein the incubating produces an incubated mixture comprising a plurality of the biologically-active bioaggregate granules, selecting out a first specified portion of the biologically-active bioaggregate granules from the incubated mixture that are smaller than a first specified size or below a first specified weight or selecting out a second specified portion of the biologically-active bioaggregates granules from the incubated mixture that are larger than a second specified size that is larger than the first specified size or over a second specified weight that is larger than the first specified weight, and removing the first specified portion and/or second specified portion of the biologically-active bioaggregate granules in an effluent stream.

According to another aspect of the present disclosure, a system for cultivating oxygenic biologically-active bioaggregate granules is described, for example for wastewater treatment. In an example, the biologically-active bioaggregate granule cultivation system includes a reaction vessel for receiving a mixture at a continuous or substantially continuous flow rate, wherein the mixture comprises a water-based reaction medium including a nutrient material that is consumable by a live bacterium or by a live protozoa, and at least one microalgae, an illumination source configured to illuminate the mixture at least intermittently for a specified time period, wherein the illumination of the mixture during the specified time period incubates the mixture such that the microalgae forms a supporting matrix that incorporate the live bacterium or the live protozoa to provide a plurality of biologically-active bioaggregate granules, a photogranule selector that removes a first specified portion of the biologically-active bioaggregate granules that are smaller than a first specified size or below a first specified weight or that removes a second specified portion of the biologically-active bioaggregates granules that are larger than a second specified size that is larger than the first specified size or over a second specified weight that is larger than the first specified weight, and an effluent stream to remove the first specified portion and/or the second specified of the biologically-active bioaggregate granules from the reaction vessel.

DETAILED DESCRIPTION

Figure 1:
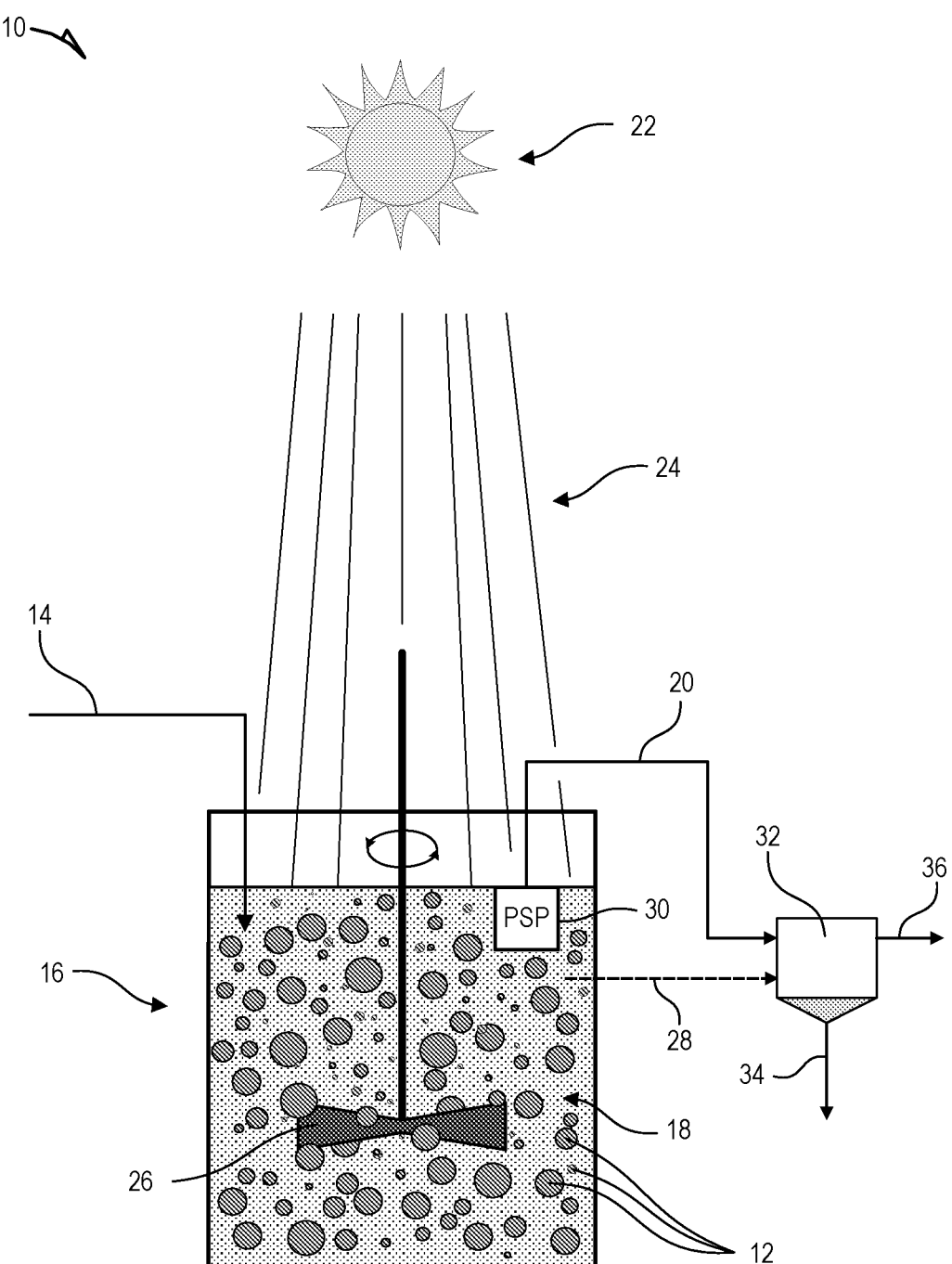
FIG. 1 is a schematic diagram of an example system for hydrodynamically cultivating oxygenic biologically-active bioaggregate granules.

The present disclosure describes systems and methods for cultivation of biologically-active bioaggregate granules comprising at least one microalgae and live bacterium or live protozoa from a water-based reaction medium, such as wastewater. The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range. The statement "about X to Y" has the same meaning as "about X to about Y,'" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G."

In methods described herein, steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Sludge granules can include a self-mobilized microbial consortia with a relatively high density and spheroidal or generally spheroidal profiles. In an example, each granule can act as a "micro-reactor" in which biochemical transformations occur. The granules' compact structure can also withstand high-strength wastewater and shock loadings. These characteristics facilitate higher retention of biomass, giving cost and space savings compared to conventional wastewater treatment operations. In an example, microbial colonialization evolves along a spatial gradient, resulting in generic layered granular structures. These self-mobilized granular bioaggregates can, in some examples, be considered supraspecific homologs, similar in structure but differing in microbial species dominance.

In an example, the biologically-active bioaggregate granules comprise oxygenic phototrophic microalgae that produce oxygen gas ($O_2$), which can be used by bacteria or protozoa, or both, to degrade organic matter within the water-based reaction medium. For this reason, the biologically-active bioaggregate granules cultivated by the systems and methods of the present disclosure will also be referred to hereinafter as "oxygenic photogranules" or "OPGs." In an example, the microbial community in OPGs includes filamentous cyanobacteria and algae species dominating the phototrophic outer layer where they can benefit from light exposure, while non-phototrophic bacteria dominate the inner core. The microalgae in the OPGs can then harvest carbon dioxide gas ($CO_2$) generated by the bacteria or protozoa, or both, as they consume organic matter, and can use the harvested $CO_2$ for photosynthesis. In some examples, the OPGs can have a relatively large size, for example from about 0.2 millimeters (mm) to about 5 mm, which can allow for good separation of the OPGs from the water-based reaction medium in order to recover the OPGs for further wastewater treatment. In some examples, the OPGs can grow larger than 5 mm. However, when a granule grows too large granule it may not be as biologically active as smaller ones.

The systems and methods described herein provide for cultivation of a relatively large number of the OPGs. The systems and methods described herein provide for specific incubation conditions such that OPGs can be formed within a wastewater. Specifically, the systems and methods include incubating a mixture of a water-based reaction medium, such as wastewater, at least one microalgae, a live bacterium or live protozoa, and a nutrient consumable by the live bacterium or by the live protozoa under the specific incubation conditions. In an example, the water-based reaction medium comprises wastewater. In an example, the water-based reaction medium comprising microbial biomass containing at least one of: microalgae, bacteria, and protozoa. In an example, the water-based reaction mixture comprising activated sludge. In an example, the specified incubation conditions include a structure or method for selecting out a specified portion of the OPGs, e.g., OPGs that are below a specified size or below a specified weight or OPGs that are over a specified size or over a specified weight, while flowing the reaction medium through the reactor on a continuous or substantially continuous basis, which the inventors have found can provide for continuous flow cultivation of OPGs.

FIG. 1 is a schematic diagram of an example system 10 for cultivation of OPGs 12 from a stream of wastewater 14. The wastewater 14 comprises a water-based reaction medium, and in an example comprises activated sludge. As used herein, the term "activated sludge" refers to a mixed liquor, a thickened mixed liquor, or biofilm present and used in water and wastewater treatment systems. Activated sludge is also sometimes referred to as "sewage sludge," "returned activated sludge, and "waste activated sludge." In an example, the activated sludge in the wastewater 14 is the inoculum source of various microorganisms that can be useful in the formation of the OPGs 12, as described herein. The microorganisms that are present in the wastewater 14, for example in the activated sludge, can include, but are not limited to, one or more of: algae, cyanobacteria, bacteria, and protozoa.

The wastewater 14 is fed into a reaction vessel 16 where it can form at least part of a reaction mixture 18. In an example, the reaction mixture 18 includes: (a) the water-based medium of the wastewater stream 14; (b) live bacterium or live protozoa, or both, which are typically present in the activated sludge; (c) a nutrient material that is consumable by the live bacterium or the live protozoa, wherein the nutrient material can comprise organic matter in the wastewater medium and/or the activated sludge that is desired to be degraded or otherwise removed from the wastewater medium as part of a wastewater treatment; and (d) at least one oxygenic microalgae, which may be present in the wastewater medium or in the activated sludge, or both. After an appreciable amount of operation time, the reaction mixture 18 will also include a sizable population of OPGs 12.

In some examples, all of the components desired for the formation of the OPGs 12 within the system 10 can already be present in the activated sludge of the wastewater 14. In other examples, one or more components can be added to the reaction mixture 18 to ensure the specified mixture of components is present in the reaction mixture 18 before incubation is begun. For example, an external source of microalgae (including cyanobacteria and/or green algae) can be added to the reaction mixture 18, additional nutrient material beyond what is already present in the wastewater 14 can be added to the reaction mixture 18, or additional water or water-based medium can be added to the reaction mixture 18.

The reaction vessel 16 is operated as a continuous-flow reactor, i.e., meaning that flow of the wastewater 14 into the reaction vessel 16 and the withdrawal of an effluent stream 20 from the reaction vessel 16 is continuous. Examples of types of continuous-flow reactors that can be used as the reaction vessel 16 in the system 10 include, but are not limited to, a continuous stirred-tank reactor ("CSTR") or a plug-flow reactor ("PFR"). In the example shown in FIG. 1, the reaction vessel 16 is a CSTR, and therefore may also be referred to as "CSTR 16." In an example, the flow into or out of the CSTR 16 (e.g., the inlet stream of the wastewater 14 and the effluent stream 20) are horizontal or substantially horizontally flowing.

The reaction mixture 18 in the reaction vessel 16 receives light irradiation from an illumination source 22 that can provide at least intermittent illumination of light 24 having a specified luminous flux (described in more detail below) onto the reaction mixture 18 within the reaction vessel 16. If the illumination source is a natural light source (e.g., natural sunlight 22 as shown in the example of FIG. 1), the sunlight can be altered, such as via one or more filters, one or more types of glass, or other materials through which the sunlight can be passed so that the light 24 that is incident upon the reaction mixture 18 has the specified luminous flux. The illumination source can also be an artificial illumination source (e.g., a lamp or other illumination source that can provide a specified light energy for the phototrophic reactions necessary for the formation of the OPGs 12, such as the lamp 22' shown in the example of FIG. 2).

In an example, the light 24 can have specified light characteristics, such as a specified luminous flux, for example defined as a photosynthetic photon flux density ("PPFD," discussed below) of $1200 \, \mu mol \, m^{-2} \, s^{-1}$ or less, for example from about $30 \, \mu mol \, m^{-2} \, s^{-1}$ to about $1200 \, \mu mol \, m^{-2} \, s^{-1}$.

In an example, the reaction mixture 18 in the reaction vessel 16 is mixed by a mixing unit 26 (e.g., an impeller 26) under specified shear conditions (described in more detail below). The mixing unit 26 can mix and suspend the OPGs 12 and other biomass in the reaction mixture 18. However, the mixing unit 26 need not be configured to fully aerate the reaction mixture 18 because sufficient oxygen can be generated by photosynthesis within the OPGs 12 in the reaction mixture 18. In an example, the mixing unit 26 is configured to provide a shear force onto the reaction mixture 18 that is within a specified shear range that is selected to promote a specified size range for the OPGs 12. When the shear force exerted on the reaction mixture 18 is relatively low, it can promote a size increase in the resulting OPGs 12, and conversely a relatively high shear force can be used to limit the size growth of the OPGs 12. As will be appreciated, when a specific OPG 12 gets above a certain size, its activity, such as its oxygenic capacity efficiency on a mass basis decreases. In an example, the mixing intensity corresponding to the specified shear force is also used to control the frequency of the exposure of the OPGs 12 to the light 24 in the continuous-flow reaction vessel 16. For example, a lower mixing intensity can be used to decrease the frequency of movement of the OPGs 12 to the surface of the reaction mixture 18 when the reaction vessel 16 is lit under strong sunlight in order to reduce photoinhibitory effects on the OPGs 12.

In an example, the specified shear range is from about 0.005 Newtons per square meter ($N/m^2$) to about 0.15 $N/m^2$, such as from about 0.01 $N/m^2$ to about 0.125 $N/m^2$, for example from about 0.015 $N/m^2$ to about 0.1 $N/m^2$. In an example, the mixing intensity and, thus, the hydrodynamic shear conditions can be controlled to provide for desired effects. In some examples, the mixing intensity (and therefore the hydrodynamic shear force) is manually controlled by operators. In other examples, the mixing intensity (and therefore the hydrodynamic shear force) is automatically controlled, for example with the mixing intensity being adjusted based on the intensity of the light 24 incident on the reaction vessel 16. In an example, the system 10 can include one or more light sensors, such as one or more floating light sensors that float on the surface of the reaction mixture 18 or one or more light sensors that are submerged in the reaction mixture 18, or both. The one or more light sensors collect the light 24 as it is emitted onto the reaction mixture 18 and the resulting signal from the light 24 can be converted into one or more corresponding parameters. In an example, the light signal is converted into a photosynthetic photon flux density ("PPFD") value (usually measured in micromoles of photons of photosynthetically active radiation ("PAR") light per square meter of the surface upon which the light is incident per second, or $\mu mol \, m^{-2} \, s^{-1}$). The mixing intensity performed by the mixing unit 26 can be set based on the determined PPFD value, for example by setting the mixing speed of the mixing unit 26 compared to a predetermined based stirring rate. In such an example, high light-intensity readings can result in reduced mixing speed, and consequently a low exposure rate for the OPGs 12.

In an example, one or more of the effluent streams leaving the reaction vessel 16 can have the same composition as the reaction mixture 18 within the reaction vessel 16, such as the optional mixed liquor ("ML") effluent 28 exiting the reaction vessel 16 in the example system of FIG. 1. In an example, one or more of the effluent streams leaving the reaction vessel 16 can have a composition that is different from that of the mixed reaction mixture 18 in the reaction vessel 16, such as the effluent stream 20 wherein a specified subset of the OPGs 12 have been selected out (that is, removed) from the effluent stream 20, such as via the use of a photogranule selection pressure ("PSP") selector 30 that selects out OPGs 12 above a specified size (e.g., above a specified granule diameter) or that are heavier than a specified weight, such that the OPGs 12 that remain in the effluent stream 20 are smaller than the specified size and/or are lighter than the specified weight. In an example, the PSP selector can also select out OPGs 12 below a specified size, such that the OPGs 12 that remain in the effluent stream 20 are bigger than a specified size and/or are heavier than a specified weight. In an example, the effluent streams leaving the reaction vessel 16 can include both one or more streams that have the same composition as the reaction mixture 18 and one or more streams that have a composition that is different from that of the reaction mixture 18.

In an example, the PSP selector 30 provides an environment in which small or light particles—i.e., those that do not typically settle in a short settling period, such as 5 minutes or less—are selectively separated and removed out of the reaction vessel 16. In an example, the PSP selector 30 provides an environment in which granules that are larger than a specified size, e.g., granules greater than 5 mm in diameter—those that are much less bioactive than smaller granules—are selectively separated and removed out of the reaction vessel 16. Hydraulic selective pressure ("HSP")-based washout can enhance microbial granulation. While the OPGs 12 can be produced without HSP, removal of small particles by HSP or by other means such as size separation has been found to be helpful for cultivation of the OPGs 12 because the small-sized particles reduce the transmission of light in the reaction mixture 18, inhibiting photosynthesis, which is the main driver of the OPG-growing process. Removal of granules that are larger than the specified size will help the system to be efficient, which will also be helpful for cultivation of the OPGs 12.

The PSP selector of the present disclosure in this invention can be placed inside or outside the main continuous-flow reactor, e.g., the reaction vessel 16. For example, the PSP selector 30 in the system 10 of FIG. 1 is located inside the reaction vessel 16, as is the corresponding PSP selector 50 in the example system 40 of FIG. 2. In contrast, and as described in more detail below, the PSP selectors 72, 92, and 112 of the example systems 70, and 110 in FIGS. 3, 4, and 5, respectively, are located outside of their respective reaction vessels 42. The PSP selectors 72, 92, 112 that are located outside of the reaction vessel 42 may be particularly useful for conducting selective removal of OPGs that are smaller than a small-end specified size or that are larger than a large-end specified size by size-based and/or hydraulic selective pressure.

Figure 2:
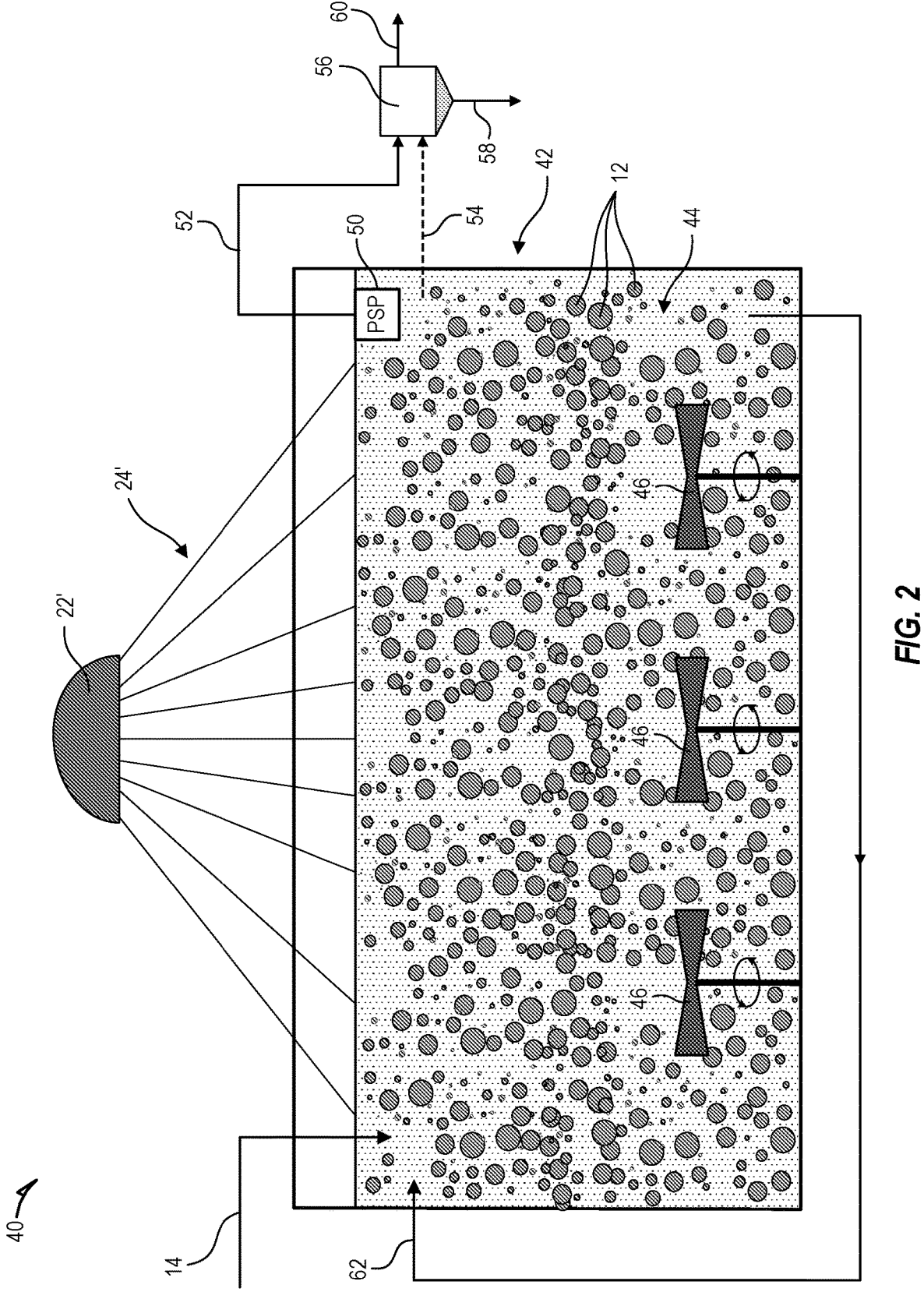
FIG. 2 is a schematic diagram of another example system for hydrodynamically cultivating oxygenic biologically-active bioaggregate granules.

In an example, the PSP selector 30 comprises a small settling zone, with or without a coarse filter or screen, that is located internally within the reaction vessel 16 (as shown in the example system 10 of FIG. 1 and the example system 40 of FIG. 2). The PSP selector 30 can be operated by gravity flow or by pumping through the PSP selector 30. The settling zone of the PSP selector 30 can provide a quiescent zone for biomass, and in particular OPGs 12, to settle within a short period of time, e.g., as little as 5 minutes. The OPGs 12 that settle in this zone are retained in the reaction vessel 16, while smaller OPGs 12 and other biomass that does not settle will exit the PSP selector 30 and leave the reaction vessel 16 via the effluent stream 20. If the PSP selector 30 is based on size separation, the pore size of the filter or screen can be greater than a specified target particle size, for example from about 100 micrometers (µm) to about 1000 µm, so that OPGs 12 and other particles that are smaller than the pore size will pass through the PSP selector 30 and leave with the effluent stream 20 while the OPGs 12 and other biomass that is larger than the pore size is retained within the reaction vessel 16. If the reaction vessel 16 is a PFR-like reactor, the biomass from the settled zone or near the filtration unit of the PSP selector can be pumped and returned to another portion of the reaction vessel (such as with the recycle stream 86 in the example system 70 of FIG. 3).

In an example, the effluent stream 20 can be passed through a clarifying unit 32, such as a de-risking settler or filter, to remove at least a portion of the small particles in the effluent stream 20 (e.g., the small-sized OPGs 12 and other biomass particles that passed through the PSP selector 30) as a waste biomass stream 34, leaving a final effluent 36 for the system 10 (also referred to as the "system effluent 36"). Based on the inventors' experience, small particles in the effluent stream 20 settle much faster than typical activated sludge flocs. Hence, the de-risking clarifier 32 can be significantly smaller than typical secondary clarifiers used in typical activated sludge processes. Therefore, in an example, the clarifying unit 32 can be substantially smaller than is typical for secondary clarifiers in conventional activated sludge processes. As the system 10 reaches an equilibrium, the effluent stream 20 can also meet the effluent quality required for municipal wastewater treatment. In such a case, the effluent stream 20 could be a final effluent of the operation in which case the clarifier 32 may not be required.

When the PSP selector 30 is in continuous operation, the effluent stream 20 out of the PSP selector 30 can be the sole effluent that is exiting the reaction vessel 16. In another example, the system 10 can include an additional optional mixed liquor ("ML") effluent 28 out of the reaction vessel 16 in addition to the effluent stream 20 out of the PSP selector 30. Effluent leaving the reaction vessel 16 outside of the PSP selector 30, e.g., the ML effluent 28, comprises the same mixed reactor content as is in the reaction mixture 18, i.e., such that there is no portion of the ML effluent 28 that has been PSP separated. One or both of the effluent stream 20 out of the PSP selector 30 and the ML effluent 28 can be fed into the clarifying unit 32. In an example, the ratio of the flow rate of the effluent stream 20 out of the PSP selector 30 relative to the flow rate of the ML effluent 28 directly out of the reaction vessel 16 can vary depending on operational conditions and targets. A stated ratio of 1:0 herein refers to when the effluent stream 20 out of the PSP selector 30 is the only effluent leaving the reaction vessel 16, i.e., such that the flow rate of the ML effluent 28 is zero.

In an example, the PSP selector 30 can also be operated intermittently. When there is no flow leaving the PSP selector 30, i.e., when the PSP selector 30 is idle and the flow rate of the effluent stream 20 is zero, then the mixed reactor content can exit the reaction vessel 16 continuously via the ML effluent 28, which can be fed into the clarifying unit 32. When the PSP selector 30 is turned on, then the effluent stream 20 out of the PSP selector 30 can be the sole effluent flow leaving the reaction vessel 16 (i.e., the flow rate of the ML effluent 28 can be zero) or it can be part of a combined flow (i.e., the flow rates of both the effluent stream 20 and the ML effluent 28 are non-zero), as described above. The state of intermittency can vary depending on operational conditions and targets of the system 10.

FIG. 2 is a schematic diagram of another example system 40 for the cultivation of OPGs 12 from a wastewater stream 14. The system 40 of FIG. 2 is similar to the example system 10 of FIG. 1. Like the system 10, the example system 40 includes a reaction vessel 42 into which is fed the wastewater 14. The wastewater 14 forms part of a reaction mixture 44, which can be similar or identical to the reaction mixture 18 described above with respect to the system 10 (e.g., with a water-based medium, e.g., from the wastewater stream 14; a live bacterium or live protozoa, or both, such as those present in activated sludge; a nutrient material consumable by the live bacterium or live protozoa, such as organic matter from the wastewater 14 and/or activated sludge within the wastewater 14; and at least oxygenic microalgae, which may be in the wastewater 14 or activated sludge, or both). As noted above, the composition of the reaction mixture 44 and the conditions in the reaction vessel 42 are such that the OPGs 12 form over time into a sizeable population, as depicted in FIG. 2.

Like the reaction vessel 16 in FIG. 1, the reaction vessel 42 of the system 40 is operated as a continuous-flow reaction, such as a CSTR with a plurality of mixing units 46 to agitate the reaction mixture 44 at a specified mixing intensity (as described above). As can be seen in FIG. 2, the reaction vessel 42 is larger than the reaction vessel 16 in the system 10 of FIG. 1, such that the reaction vessel 42 includes three mixing units 46 rather than just a single mixing unit 26. An illumination source 22' is provided to at least partially illuminate the reaction mixture 44 with light 24'. As noted above, in the example system 40 the illumination source 22' is an artificial lamp 22' rather than natural sunlight 22 as in FIG. 1, such that the resulting light 24' is artificially-generated light 24' rather than natural sunlight 24 as in FIG. 1.

The system 40 also includes a PSP selector 50 that can be configured to operate in a manner similar or identical to the PSP selector 30 described above to provide an effluent stream 52 that exits the PSP selector 50. An optional mixed liquor ("ML") effluent 54 that does not pass through the PSP selector 50 can also exit the reaction vessel 42. One or both of the effluent stream 52 from the PSP selector 50 or the ML effluent 54 exiting directly from the reaction vessel 42 can be fed into a clarifying unit 56 that can be similar or identical to the clarifying unit 32 described above with respect to the system 10 of FIG. 1. The clarifying unit 56 can remove at least a portion of the small particles (e.g., small-sized OPGs 12 and other biomass particles) as a waste biomass stream 58 from the effluent stream 52 and/or the ML effluent 54 to provide a system effluent 60. The system 40 can also include a recycle stream 62 that withdraws a portion of the reaction mixture 44 from one part of the reaction vessel 42 and injects it into another part of the reaction vessel 42.

Figure 3:
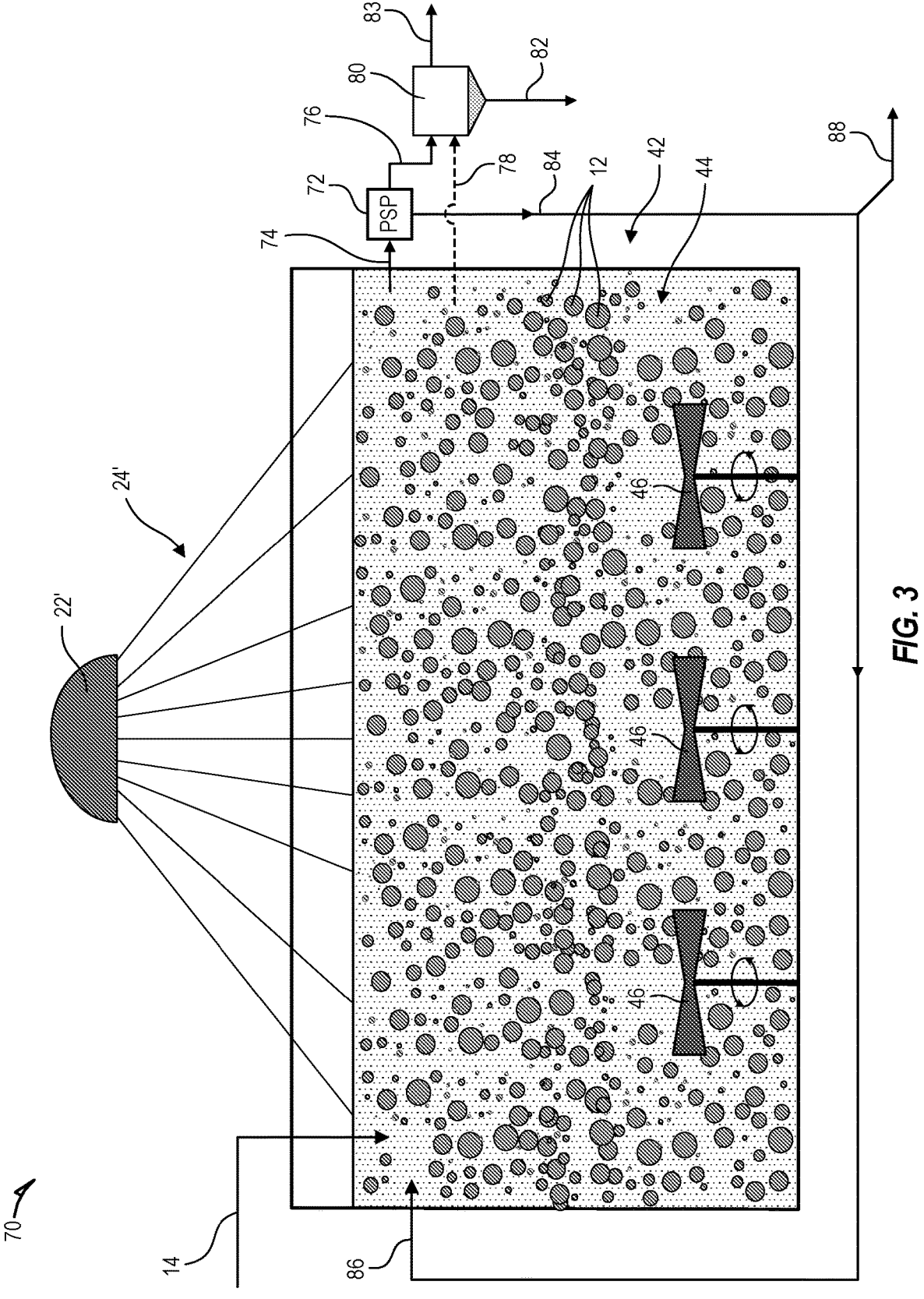
FIG. 3 is a schematic diagram of a third example system for hydrodynamically cultivating oxygenic biologically-active bioaggregate granules.
Figure 4:
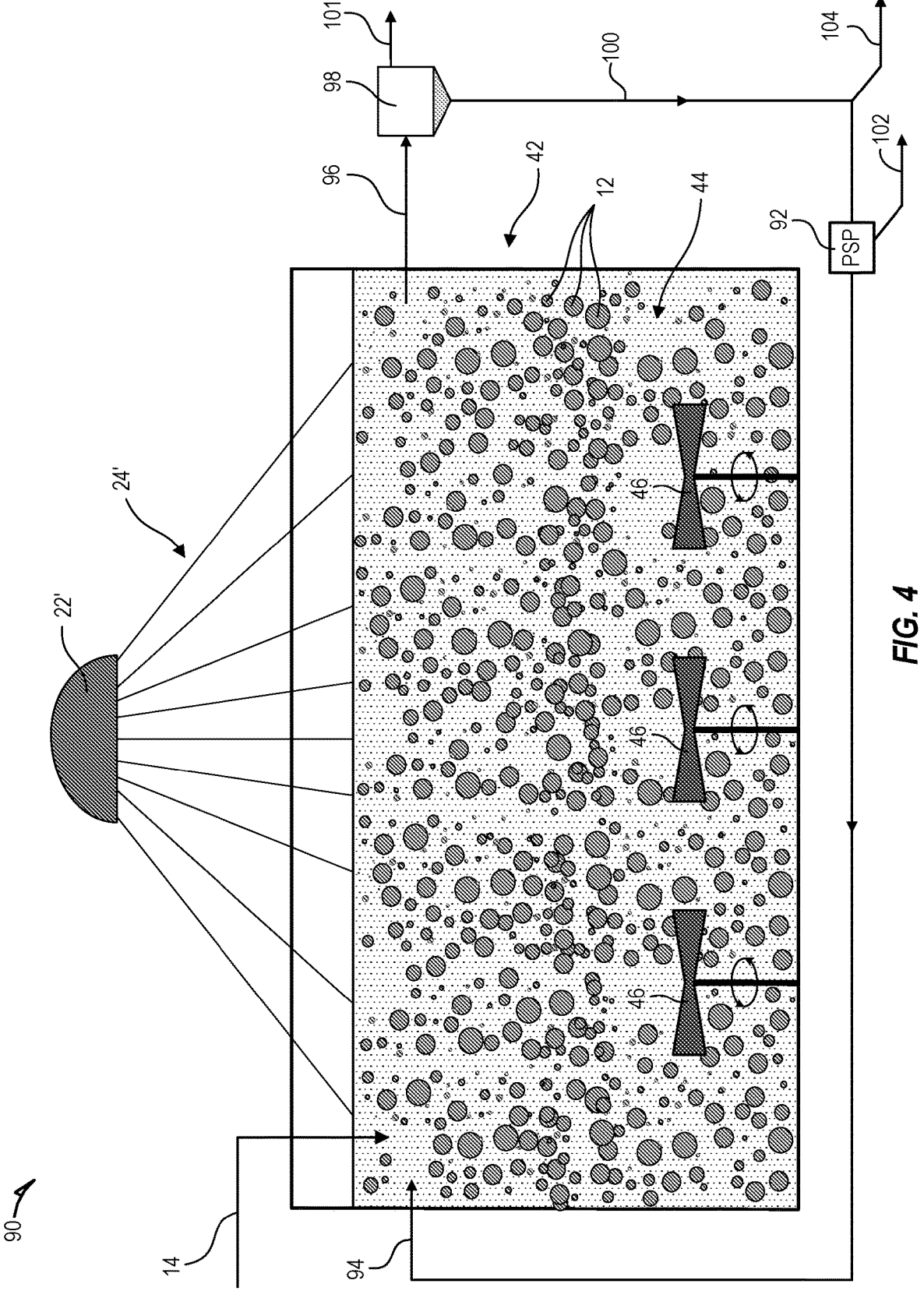
FIG. 4 is a schematic diagram of a fourth example system for hydrodynamically cultivating oxygenic biologically-active bioaggregate granules.
Figure 5:
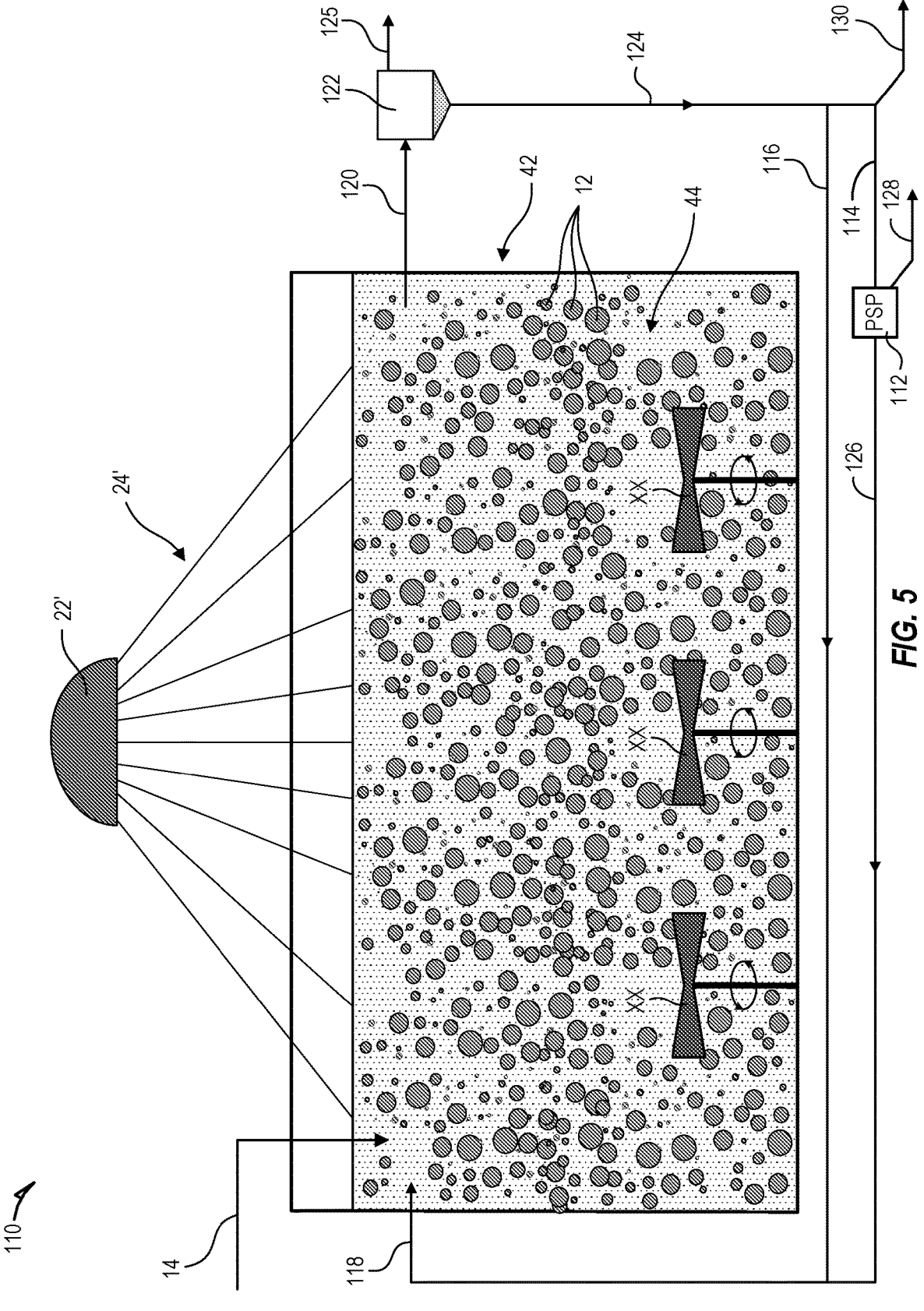
FIG. 5 is a schematic diagram of a fifth example system for hydrodynamically cultivating oxygenic biologically-active bioaggregate granules.

As mentioned above, the PSP selector that is used to remove a portion of the OPGs 12, e.g., OPGs 12 that are smaller than a small-end specified size or that are larger than a large-end specified size, can be internal to the reaction vessel (as in FIGS. 1 and 2), or it can be external to the reaction vessel. FIGS. 3, 4, and 5 are schematic diagrams of example systems 70, 90, 110 that each include an external PSP selector 72, 92, 112 rather than the internal PSP selectors 30, 50 shown in the systems 10, 40 of FIGS. 1 and 2. Many of the components of the systems 70, 90, and 110 of FIGS. 3-5 are similar or identical to those of the system 40 of FIG. 2 and are, therefore, given the same reference numbers (e.g., the illumination source 22', the reaction vessel 42, reaction mixture 44, and the mixing units 46).

In an example, the external PSP selector 72, 92, 112 can be a small settler, a coarse filter or screen, a hydrocyclone, other devices, or a combination of these mentioned devices, which can be used to select both small particles that are smaller than a small-end specified size or large OPGs that are larger than a large-end specified size, based on hydraulic selective pressure ("HSP") or particle size. In an example, a series of one or more hydrocyclones can be used to remove target size particles (e.g., small particles that are smaller than a small-end specified size and large OPGs that are larger than a large-end specified size) from an effluent stream. In another example, a hydrocyclone that has multiple overflows and underflows can be used to remove both small particles (smaller than the small-end specified size) and large particles (larger than the large-end specified size) from an effluent stream. The external PSP selector 72, 92, 112 can be installed at various locations relative to the reaction vessel 42, as shown in FIGS. 3-5. For example, in the system 70 of FIG. 3, the PSP selector 72 is located on an effluent line 74 that exits the reaction vessel 42. Small particles that pass through and are not retained by the PSP selector 72 leave as a PSP effluent stream 76, which can be fed into a clarifying unit 80, which can be similar or identical to the clarifying units 32, 56 of the systems 10 and 40 of FIGS. 1 and 2, respectively. Similarly, large particles that are separated out by the PSP selector 72 leave as the PSP effluent stream 76, which can be fed into the clarifying unit 80. An optional mixed liquor ("ML") effluent 78 that exits directly from the reaction vessel 42 can also be fed into the clarifying unit 80. The clarifying unit 80 can remove at least a portion of the small particles (e.g., small-sized OPGs 12 and other biomass particles) as a waste biomass stream 82 from the PSP effluent stream 76 and/or the ML effluent 78 to provide a system effluent 83.

The biomass that is retained by the PSP selector 72 (e.g., that are not separated out into the PSP effluent stream 76) passes through a PSP retention line 84. In an example, at least a portion of the retained biomass in the PSP retention line 84 is recycled back to the reaction vessel 42 via a recycle line 86. In an example, another portion of the retained biomass in the PSP retention line 84 is removed as a biomass purge 88 to control the mass of the OPGs 12 in the reaction vessel 42 and the growth rate of the biomass that forms the OPGs 12.

In another example, shown in the example system 90 of FIG. 4, the external PSP selector 92 can be operated at the recycle line 94 that is recycled back to the reaction vessel 42. For example, an effluent stream 96 that exits the reaction vessel 42 can be fed into a clarifying unit 98, which can be similar or identical to the clarifying units 32, 56, and 80 described above. The clarifying unit 98 can settle at least a portion of the biomass in the effluent stream 96 as a settled stream 100, leaving a system effluent 101 as the filtrate or supernatant fluid off the clarifying unit 98. The settled stream 100 can be fed into the PSP selector 92. The smaller-sized and/or larger-sized biomass that is not retained by the PSP selector 92 can be removed from the system 90 as a waste sludge 102. The biomass that is retained by the PSP selector 92 can be sent back to the reaction vessel 42 via the recycle line 94. A portion of the settled stream 100 can also be removed as a biomass purge 104 similar to the biomass purge 88 of the system 70, e.g., to control the mass of the OPGs 12 in the reaction vessel 42 and the growth rate of the biomass that forms the OPGs 12.

In yet another example, as shown in the example system 110 of FIG. 5, the external PSP selector 112 is operated at an additional side-stream line 114 that is separate from a recycle line 116, both of which are combined and returned to the reaction vessel 42 as a return line 118. For example, an effluent stream 120 that exits the reaction vessel 42 can be fed into a clarifying unit 122, which can be similar or identical to the clarifying units 32, 56, 80, and 98 described above. The clarifying unit 122 can settle at least a portion of the biomass in the effluent stream 120 as a settled stream 124, leaving a system effluent 125 as the filtrate or supernatant fluid off the clarifying unit 122. The settled stream 124 can be split into the side-stream line 114 that is fed into the external PSP selector 112 and the recycle line 116 that bypasses the PSP selector 112. The smaller-sized biomass and/or larger-sized biomass that is not retained by the PSP selector 112 can be removed from the system 110 as a waste sludge 128. The biomass that is retained by the PSP selector 112 can be sent back to the reaction vessel 42 via a PSP return line 126, which is combined with the recycle line 116 to form the return line 118. A portion of the settled stream 124 can also be removed as a biomass purge 130 similar to the biomass purges 88 and 104, e.g., to control the mass of the OPGs 12 in the reaction vessel 42 and the growth rate of the biomass that forms the OPGs 12.

In another example (not shown), a system can be operated with two or more external PSP selectors located at two or more of the locations described above with respect to the example systems 70, 90, and 110 of FIGS. 3-5, respectively, and in one example, a system can include external PSP selectors at all three locations (e.g., in the effluent line 74 exiting the reaction vessel 42, in the recycle line 94 being fed back to the reaction vessel 42, and in a side-stream line 114).

Figure 6:
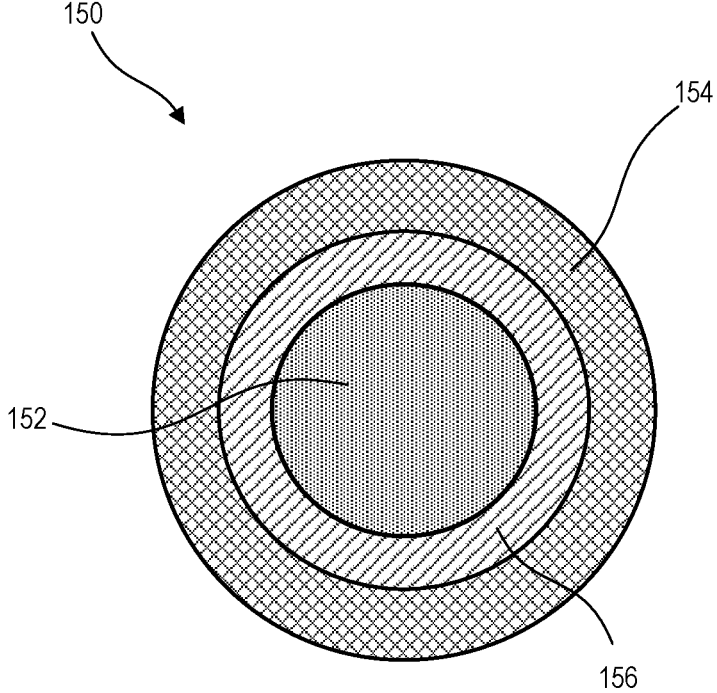
FIG. 6 is a cross-sectional view of an example oxygenic photogranule that can be cultivated in the example systems of FIGS. 1-5.

In an example, the operation of the example systems 10, 40, 70, 90, 110 under the described incubation conditions can result in OPGs having a certain structural configuration. FIG. 6 shows a conceptual view of the cross section of an example OPG 150 formed by the example systems 10, 40, 70, 90, 110 of the present disclosure. Those having skill in the art will appreciate that the structure shown in FIG. 6 is meant only as a conceptual illustration of the structure that the inventors believe occurs for one example OPG 150. The specific structure of the OPG 150 shown in FIG. 6 is not to be taken as limiting.

In an example, the OPG 150 includes an inner core 152, an outer layer 154, and a middle layer 156 located between the inner core 152 and the outer layer 154. In an example, the outer layer 154 of the OPG 150 that form under the specified incubation conditions comprise a supporting matrix formed from filamentous cyanobacteria, and in particular motile filamentous cyanobacteria. In an example, the middle layer 156 can comprise some of the live bacteria or live protozoa, or both, and in some examples, green algae and a smaller concentration of filamentous cyanobacteria compared to that in the outer layer 154. In an example, the inner core 152 primarily comprises sludge-like material, e.g., a small amount of the activated sludge. The structure of the OPG 150 has been found to not only provide for a stable structure during the formation of the OPG 150, but it can also allow the fully-formed OPGs 150 to withstand larger forces, including shock loading of wastewater or more vigorous agitation during wastewater treatment, and thus can facilitate a relatively higher retention of biomass that can be used for subsequent wastewater treatment.

In an example, it was found that substantial growth of filamentous cyanobacteria such as genus *Microcoleus, Phormidesmis, Oscillatoria, Letptolyngbia, Plectonema, Geitlerinema, Tychonema, Pseudanabaena, Nostoc, Calothrix, Fischerella, Nodularia, Tolypothrix, Scytonema*, and *Anabaena* filamentous cyanobacteria, which belong to the order Oscillatoriales or Nostocales can be particular helpful in granulation. It is believed that this occurs because growth of the filamentous cyanobacteria, in particular Oscillatoriales or Nostocales, in a relatively high cell density allows the gliding motility of the motile filamentous cyanobacteria to form interwoven structures that can act as a supporting matrix for the other components of the OPG, such as the activated sludge and the live bacteria or live protozoa, or both.

In an example, the addition of a small amount of iron (Fe) can enhance granulation. It is believed that this occurs because the available Fe accelerates the growth of cyanobacteria and its ultimate limitation promotes the granulation of cyanobacteria.

Further details regarding OPGs and the systems and methods described herein are provided in: Gikonyo, J. G., et al., "Scaling-up of Oxygenic Photogranular System in Selective-CSTR," *Bioresource Technology Reports* (BITEB-D-23-00380; in revision); Gikonyo, J. G., et al., "In vivo evaluation of oxygenic photogranules' photosynthetic capacity by pulse amplitude modulation and phototrophic-irradiance curves," *ACS ES&T Engineering* 1(3), 551-61 (2021); Abouhend, A. et al., "Growth Progression of Oxygenic Photogranules and Its Impact on Bioactivity for Aeration-Free Wastewater Treatment," *Environmental Science and Technology*, 54, 1, 486-496 (2020); Ansari, A. et al., "Photogranulation in a hydrostatic environment occurs with limitation of iron," *Environmental Science and Technology*, 55, 15, 10672-10683 (2021); Park, C. et al., "Unmasking photogranulation in decreasing glacial albedo and net autotrophic wastewater treatment," *Environmental Microbiology*, (2021), available at https://doi.org/10.1111/1462-2920.15780; Gikonyo, J. G. et al., "Hydrodynamic granulation of oxygenic photogranules," *Environmental Science: Water Research & Technology* 7, 427-40 (2021); U.S. Pat. No. 10,189,732, entitled "ALGAL-SLUDGE GRANULE FOR WASTEWATER TREATMENT AND BIOENERGY FEEDSTOCK GENERATION," issued on Jan. 29, 2019; and Gikonyo et al., PCT Application No. PCT/US2021/072725, entitled "SYSTEM AND METHOD FOR HYDRODYNAMIC CULTIVATION OF SEED OXYGENIC PHOTOGRANULES," filed on Dec. 3, 2021, which in turn claims priority to U.S. Provisional Application No. 63/121,624, entitled "SYSTEM AND METHOD FOR HYDRODYNAMIC CULTIVATION OF SEED OXYGENIC PHOTOGRANULES," filed on Dec. 4, 2020; the disclosures of which are incorporated by reference herein in their entireties.

Example

Various embodiments of the present invention can be better understood by reference to the following EXAMPLE which is offered by way of illustration. The present invention is not limited to the EXAMPLE given herein.

A CSTR with an internal PSP selector (similar to the example system 10 described above with respect to FIG. 1) was operated to cultivate OPGs. An artificial light source with a photosynthetic photon flux density ("PPFD") value of about 400 $\mu mol \cdot m^{-2} \cdot s^{-1}$ The working volume of the CSTR was 120 liters (L). The CSTR was mixed with an overhead mixer having a three-bladed hydrofoil impeller. The impeller was initially operated at a rotational speed of 60 rotations per minute (rpm), which was found to have created a shear rate of about 16 $s^{-1}$ and a shear force of about 0.018 $N/m^2$. After a specified period of time, the mixing speed of the impeller was increased to 80 rpm, which was found to increase the shear rate to about 42 $s^{-1}$ and a shear force of about 0.042 $N/m^2$.

The feed to the CSTR was actual municipal wastewater, which was pumped from a splitter box at a municipal wastewater treatment plant in Amherst, MA, USA. The hydraulic retention time of the reaction mixture in the CSTR varied from about 6 hours to about 24 hours.

A cylindrical column was partly submersed in the reaction mixture of the CSTR, which served as the internal PSP selector. The volume of this column that was submerged in the reaction mixture of the CSTR varied between about 0.5 L and about 1 L. This was found to result in a retention time within the internal PSP selector column of from about 2 minutes to about 5 minutes. The retention time in the internal PSP selector was substantially shorter than is typical for sludge settling times in a typical activated sludge process, which can be as high as 2 to 3 hours. Therefore, the internal PSP provided a strong hydraulic selective pressure ("HSP") in the CSTR such that small or light particles were continuously separated from the CSTR.

Figures 7A, 7B, 7C, 7D, 7E, 7F:
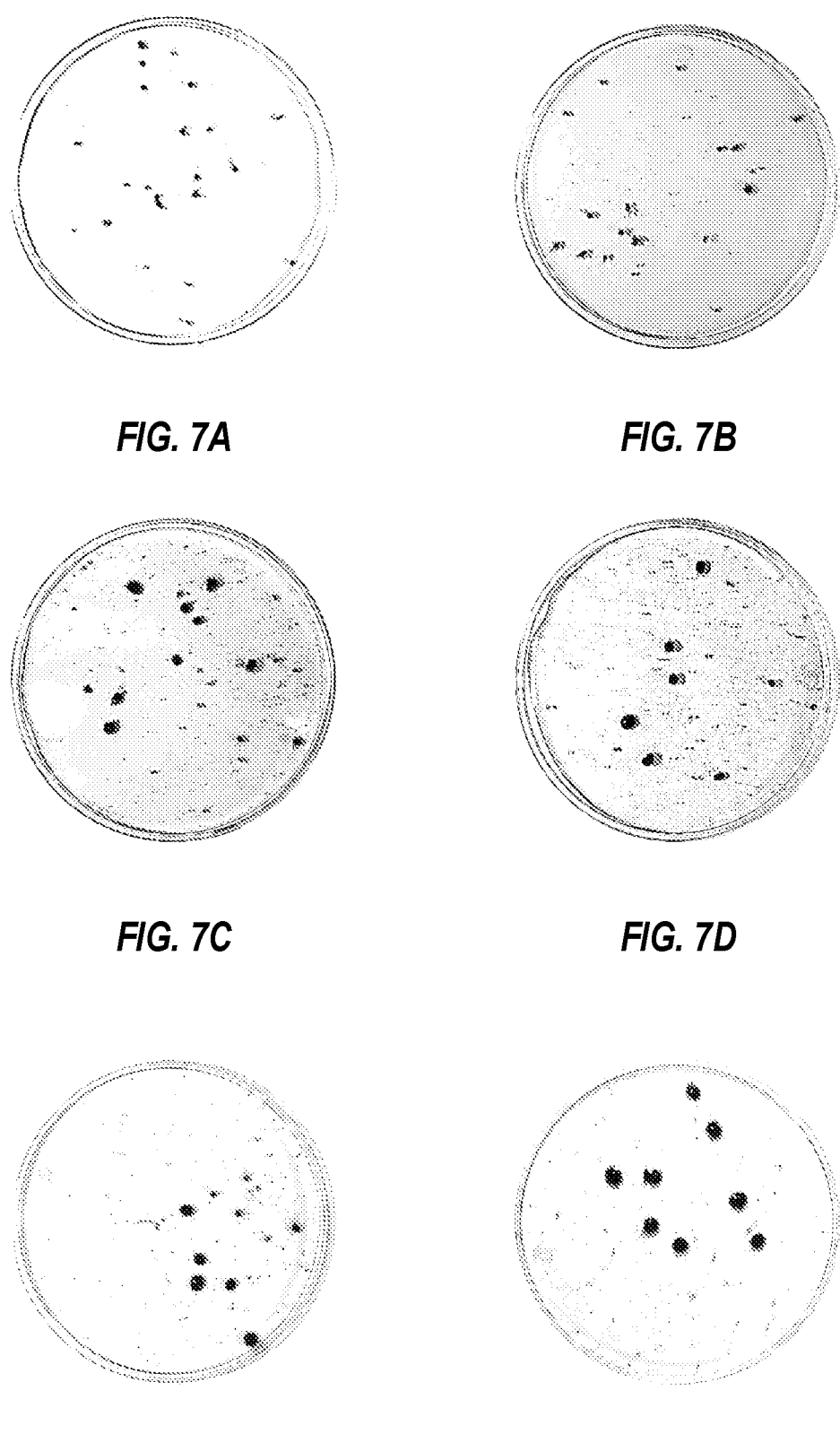
FIGS. 7A-7O are images of samples from cultivated oxygenic photogranules at various stages during the experiment of the EXAMPLE.
Figures 7G, 7H, 7I, 7J, 7K, 7L:
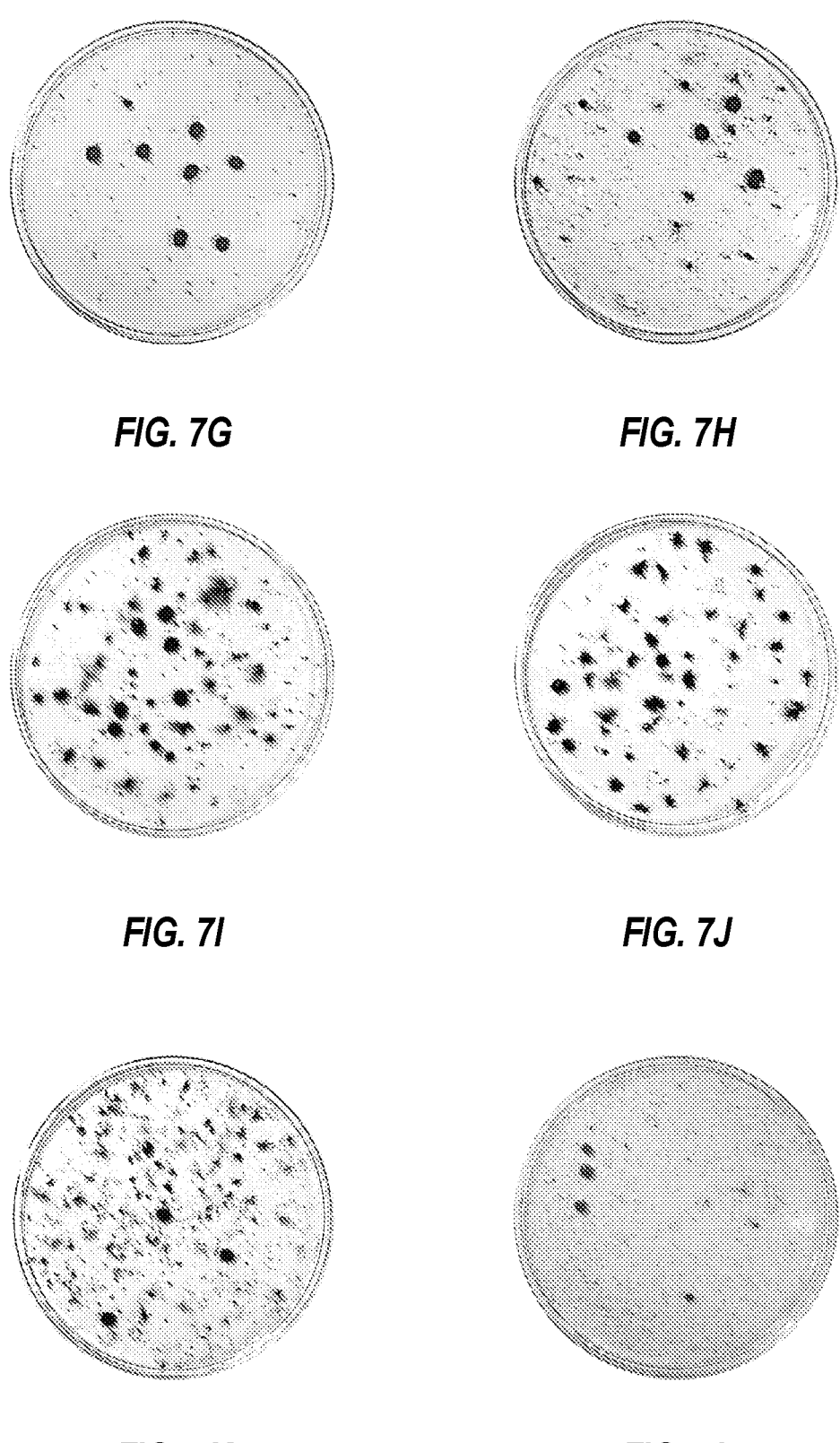
Figure 7O:
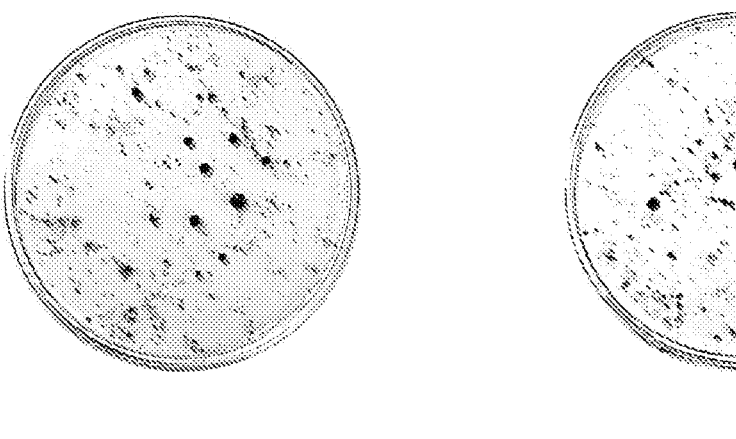
Figure 7O:
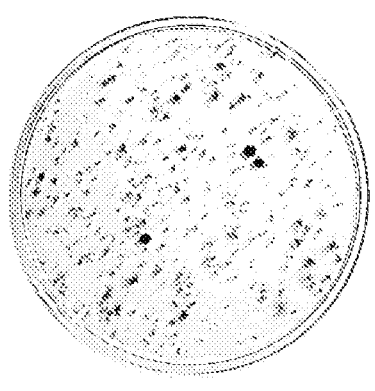

FIGS. 7A-7O shows photographs of samples of the OPG biomass grown in the CSTR over a period of five (5) months in 2021. FIG. 7A shows the grown biomass after two (2) days; FIG. 7B shows the grown biomass after ten (10) days; FIG. 7C shows the grown biomass after twenty one (21) days; FIG. 7D shows the grown biomass after thirty one (31) days; FIG. 7E shows the grown biomass after thirty eight (38) days; FIG. 7F shows the grown biomass after forty nine (49) days; FIG. 7G shows the grown biomass after sixty three (63) days; FIG. 7H shows the grown biomass after seventy three (73) days; FIG. 7I shows the grown biomass after eighty four (84) days; FIG. 7J shows the grown biomass after ninety eight (98) days; FIG. 7K shows the grown biomass after one hundred eight (108) days; FIG. 7L shows the grown biomass after one hundred twenty three (123) days; FIG. 7M shows the grown biomass after one hundred thirty three (133) days; FIG. 7N shows the grown biomass after one hundred forty (140) days; and FIG. 7O shows the grown biomass after one hundred fifty (150) days.

Figure 8:
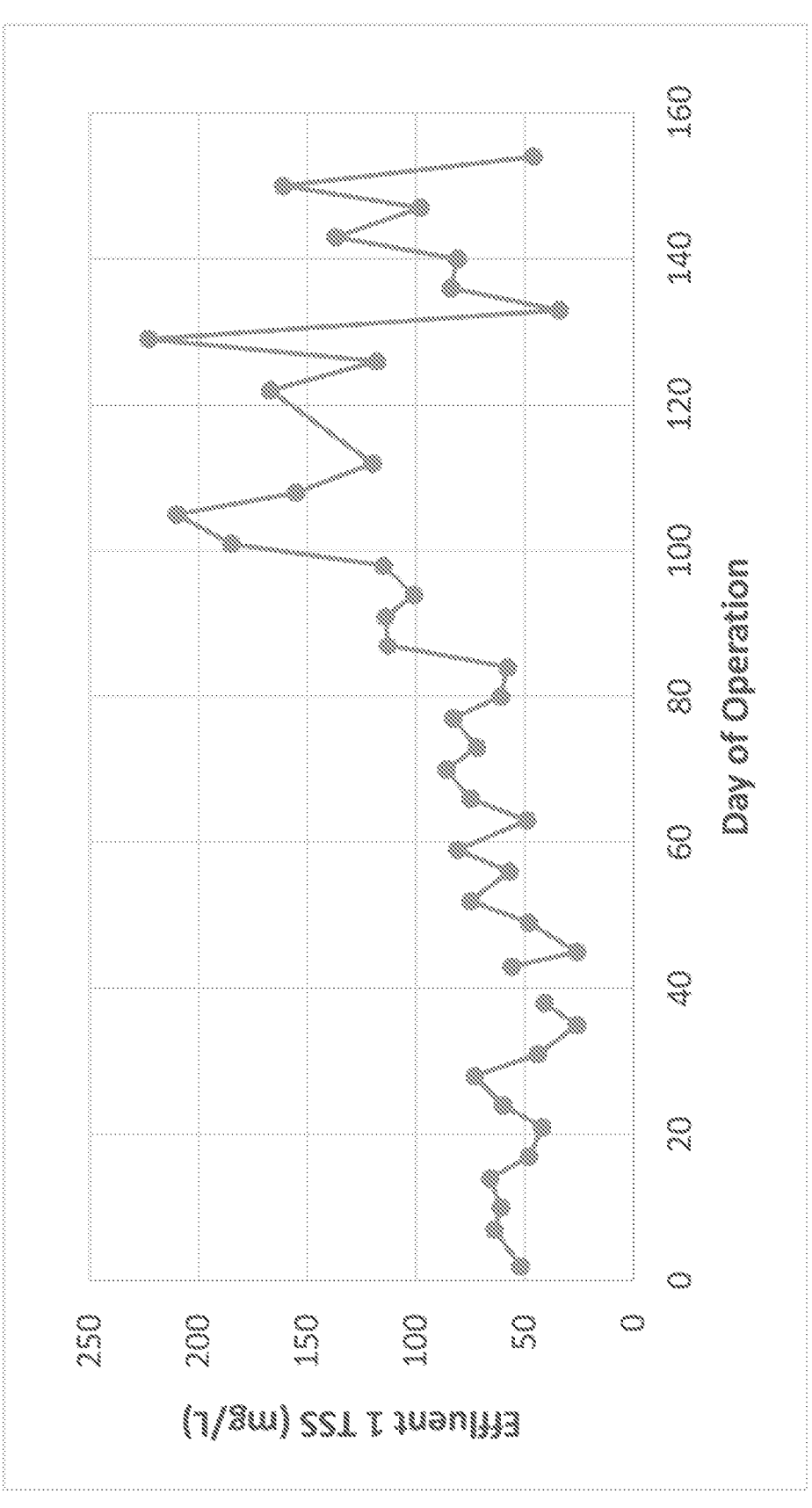
FIG. 8 is a graph of the total suspended solids in an effluent from a photogranule selection pressure selector in the experiment of the EXAMPLE.
Figure 9:
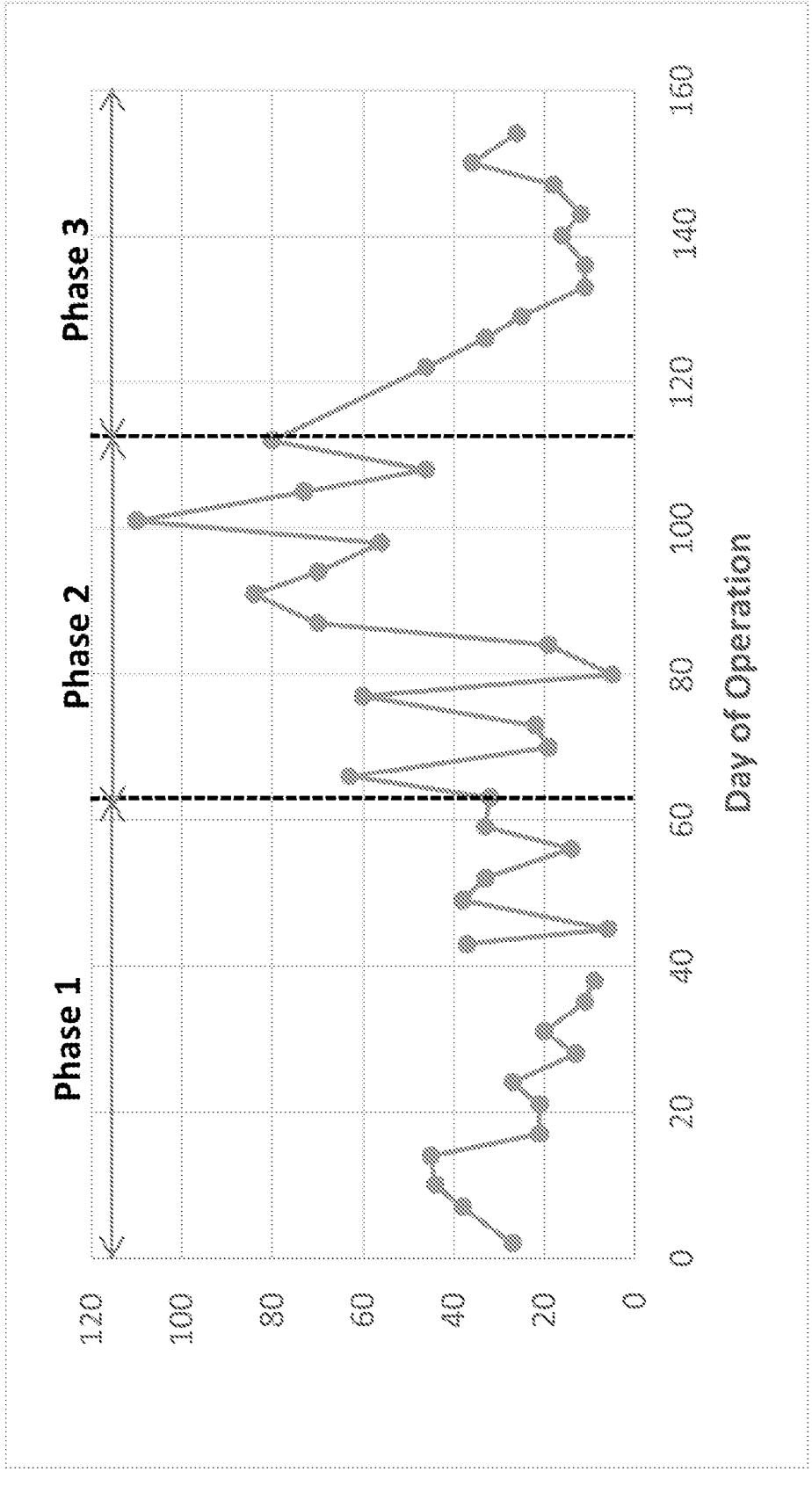
FIG. 9 is a graph of the total suspended solids in the system effluent from a clarifying unit in the experiment of the EXAMPLE.
Figure 10:
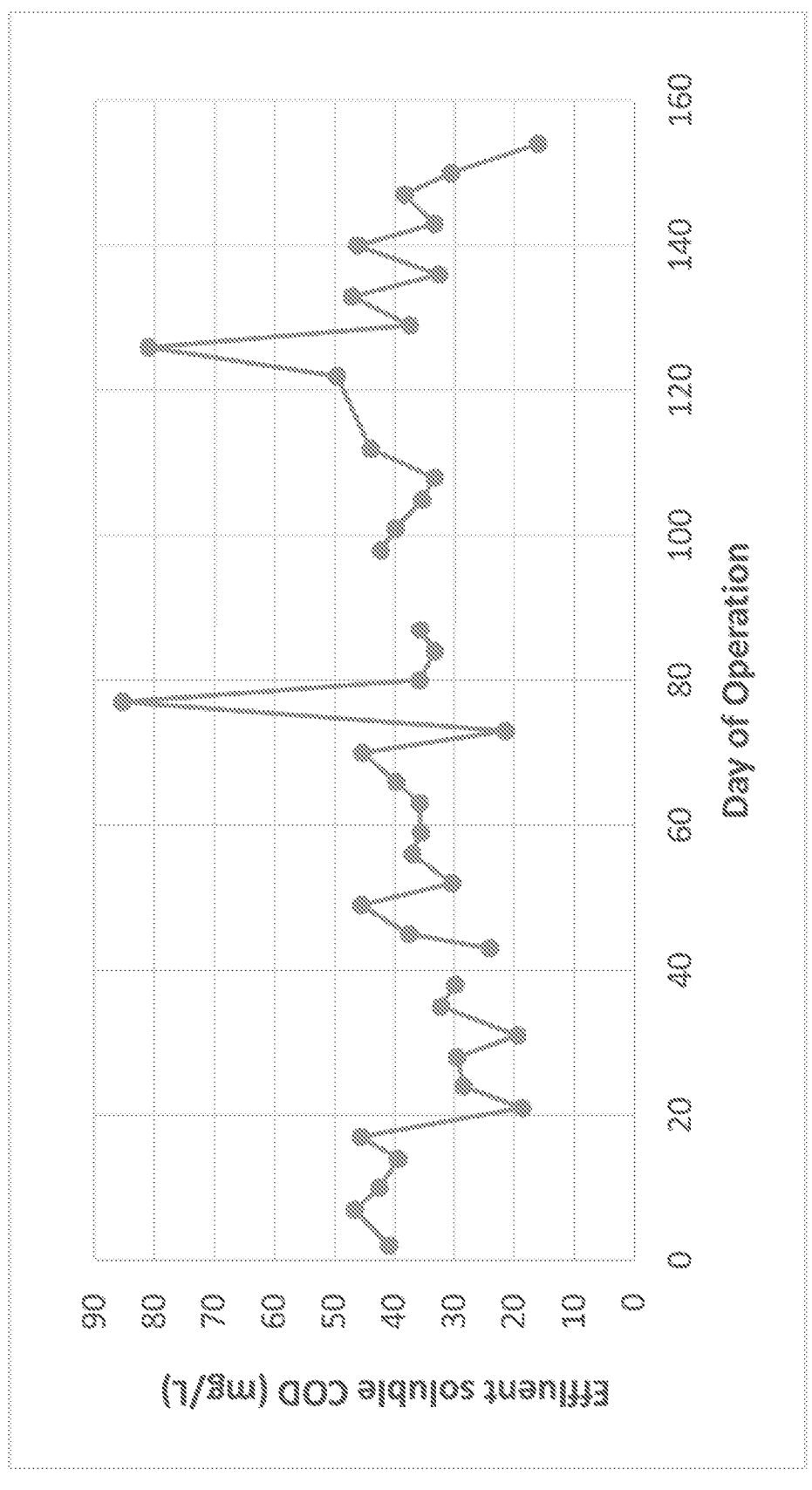
FIG. 10 is a graph of the chemical oxygen demand in the effluent from the photogranule selection pressure selector in the experiment of the EXAMPLE.

FIGS. 8-10 are graphs of various parameters of the system. FIG. 8 is a graph of the total suspended solids ("TSS") in the effluent stream corning out of the PSP selector column (e.g., the effluent stream 20 in the example system 10 of FIG. 1) that were retained by the PSP selector column. FIG. 9 is a graph of the TSS in the effluent stream corning out of a subsequent clarifying unit (e.g., the system effluent 36 that exits the clarifying unit 32 in the system 10 of FIG. 1), which was collected after fifteen (15) minutes of settling in the clarifying unit. The effluent that produced the data of FIG. 9 could have been collected after longer settling time, which would enhance more solids separation, but for convenience of the study, only 15 min settling time was chosen and used throughout the study. FIG. 10 is a graph of the soluble chemical oxygen demand ("COD") of the effluent stream coming out of the PSP selector column (e.g., the effluent stream 20 in the example system 10 of FIG. 1).

The 120 L CSTR of this EXAMPLE was operated in three main phases (with the three phases being shown as dividing the graph of FIG. 9). Phase 1 comprised the first two months (e.g., approximately days one (1) through sixty (60)) of the experiment. During Phase 1, the OPG biomass substantially propagated, and in particular via the OPG's growth in granule size. The inventors believe that this data suggests that the operational conditions of the CSTR with the PSP selector promoted OPG granulation. The period of Phase 1 occurred with effective wastewater treatment, indicated by the low COD (FIG. 10) and low effluent TSS for both the effluent from the PSP selector (FIG. 8) and for the effluent from the clarifying unit (FIG. 9). Even for the effluent out of extremely short settling of the PSP selector (FIG. 8), the TSS was relatively low. The inventors were also able to observe the presence and movement of many large size OPGs in very clear water within the reaction mixture in the CSTR.

Phase 2 occurred during approximately the next 50 days (e.g., approximately days sixty one (61) through one hundred twelve (112)). During Phase 2, deteriorated granular structures, and in particular structures from deteriorated large granules, were more frequently observed. This period coincided with an observed reduction in effluent quality, as indicated by the increase in TSS in both the effluent from the PSP selector (FIG. 8) and the effluent from the clarifying unit (FIG. 9). The inventors believe that this decline in granulation and water quality was associated with excessive growth in the size of the OPGs in the CSTR, which reduced the OPGs' activity. The worsened granular structure also coincided with growth of hairy biomass as well as fine suspended particles, reducing light availability in the reaction mixture, which further reduced granulation and water quality via feedback effects. This suggests that accumulation of large-size granules that are larger than a large-end specified size decreases the system's granulation mode and treatment function. Hence, this large-size biomass should also be properly removed from the system.

On day one hundred twelve (112), the inventors increased the mixing intensity and shear force as described above, e.g., from 60 rpm to 80 rpm. This marked the start of Phase 3, which continued until the end of the experiment at day one hundred fifty (150). The increase in shear started clearing up the system by reducing the size of the OPGs, as indicated by the reduction in TSS for both effluents (FIGS. 8 and 9) and the reduction in effluent COD (FIG. 10) that occurred during Phase 3. Importantly, the OPGs were still well formed with the greater shear force, but the maximum size of OPGs became smaller. The balanced size distribution led to the improvement in effluent quality, in particular in the TSS of the effluent from the clarifying unit (FIG. 9) and the COD of the effluent from the PSP selector (FIG. 10). The inventors also observed that nitrification was more effectively achieved when the granule size was smaller and balanced during the Phase 3 of the study of this EXAMPLE.

The inventors believe that this EXAMPLE demonstrates that OPGs can effectively be operated in light-lit continuous-flow reactors with proper PSP and hydrodynamic shear. The CSTR in this EXAMPLE did not have artificial aeration. Rather, oxygen was introduced to the system via the photosynthesis-based aerobic process of the oxygenic nature of the OPGs. The inventors also wish to note that based on conventional knowledge, a CSTR is a difficult environment for microbial granulation to occur. This EXAMPLE shows, therefore, that the systems of the present disclosure provide for a novel method to support OPG granulation in a large-scale continuous-flow system, treating real municipal wastewater. The inventors believe that all these factors will be helpful to scale up the OPG process for real-world application, especially for municipal wastewater treatment.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising the steps of:

flowing a mixture comprising a water-based reaction medium and at least one microalgae into a reaction vessel at a continuous or substantially continuous flow rate, wherein the water-based reaction medium comprises a nutrient material that is consumable by a live microalgae, by a live bacterium, or by a live protozoa present in the water-based reaction medium;

incubating the mixture in the reaction vessel, wherein the incubating comprises agitating the mixture under specified agitation conditions while exposing the mixture to at least intermittent illumination with a specified luminous flux during periods of illumination such that the microalgae forms a supporting matrix that incorporates the live microalgae, the live bacterium, or the live protozoa into a biologically-active bioaggregate granule, wherein the incubating produces an incubation mixture comprising a plurality of the biologically-active bioaggregate granules, wherein the incubating of the mixture does not include artificial aeration of the mixture; and selecting out a first specified portion of the biologically-active bioaggregate granules from the incubation mixture that are smaller than a first specified size or below a first specified weight and removing the first specified portion of the biologically-active bioaggregate granules in an effluent stream or selecting out a second specified portion of the biologically-active bioaggregate granules from the incubation mixture that are larger than a second specified size that is larger than the first specified size or over a second specified weight that is larger than the first specified weight and removing the second specified portion of the biologically-active bioaggregate granules in the effluent stream.

2. The method of claim 1, further comprising settling the effluent stream comprising the first specified portion and/or the second specified portion of the biologically-active bioaggregate granules for a specified settling time.

3. The method of claim 1, wherein the selecting out of the first specified portion of the biologically-active bioaggregate granules or the selecting out of the second specified portion of the biologically-active bioaggregate granules is performed by hydraulic selective pressure.

4. The method of claim 1, wherein the selecting out of the first specified portion of the biologically-active bioaggregate granules or the second specified portion of the biologically-active bioaggregate granules is performed by a photogranule selection pressure selector.

5. The method of claim 1, wherein the specified luminous flux is defined as a photosynthetic photon flux density onto the mixture in the reaction vessel from about 30 $\mu$mol m$^{-2}$ s$^{-1}$ to about 1200 $\mu$mol m$^{-2}$ s$^{-1}$.

6. The method of claim 1, wherein the intermittent illumination comprises sunlight, further comprising modulating the sunlight so that a photosynthetic photon flux density onto the mixture in the reaction vessel is 1200 $\mu$mol m$^{-2}$ s$^{-1}$ or less and to reduce ultraviolet light from the sunlight that is incident onto the mixture.

7. The method of claim 1, further comprising adding at least one of: carbon dioxide, oxygen, air, and iron (Fe) to the mixture.

8. The method of claim 1, further comprising recycling biomass back to the reaction vessel in a recycle line and adding at least one of carbon dioxide and oxygen to the recycle line.

9. The method of claim 1, further comprising adding organic matter to the mixture.

10. The method of claim 9, wherein the organic matter comprises at least one of: one or more sugars, an acetate, a glycerol, methanol, or beverage or brewery wastewater.

11. The method of claim 1, wherein the specified agitation conditions comprise applying a shear force to the mixture of from about 0.005 Newtons per square meter to about 0.15 Newtons per square meter.

12. The method of claim 1, wherein the water-based reaction medium comprises at least one of wastewater and activated sludge.

13. A method of wastewater remediation, comprising the steps of:

adding a first portion of the plurality of the biologically-active bioaggregate granules made according to claim 1 into a wastewater treatment system;

receiving wastewater having a first amount of biologically-active waste per unit volume into the wastewater treatment system; and operating said wastewater treatment system under operating conditions that allow the first portion of the plurality of biologically-active bioaggregate granules to consume a portion of the biologically-active waste to provide a processed wastewater having a second amount of biologically-active waste per unit volume, the second amount being lower than the first amount.

14. A method of generating biomass, the method comprising the steps of:

adding a first portion of the plurality of biologically-active bioaggregate granules made according to the method of claim 1 into a wastewater treatment system;

operating the wastewater treatment system under operating conditions that allow the first portion of the biologically-active bioaggregate particles to generate an additional quantity of the biologically-active bioaggregate granules that is more than the first portion; and recovering from the wastewater treatment system at least some of the additional quantity of the biologically active bioaggregate granules, leaving in the wastewater treatment system a sufficient amount of the biologically-active bioaggregate granules to continue operation of the wastewater treatment system.

15. A system comprising:

a reaction vessel for receiving a mixture at a continuous or substantially continuous flow rate, wherein the mixture comprises a water-based reaction medium including a nutrient material that is consumable by a live microalgae, by a live bacterium, or by a live protozoa, and at least one microalgae;

an illumination source configured to illuminate the mixture at least intermittently with a specified luminous flux during periods of illumination for a specified time period;

an agitator configured to agitate the mixture during the specified time period, wherein the illumination and the agitation of the mixture during the specified time period incubates the mixture such that the microalgae forms a supporting matrix that incorporates the live microalgae, the live bacterium, or the live protozoa to provide a plurality of biologically-active bioaggregate granules, wherein the mixture is not artificially aerated during the illumination and agitation of the mixture of the specified time period to form the plurality of biologically-active bioaggregate granules;

a photogranule selector that is configured to:

remove a first specified portion of the biologically-active bioaggregate granules that are smaller than a first specified size or below a first specified weight; or remove a second specified portion of the biologically-active bioaggregate granules that are larger than a second specified size that is larger than the first specified size or above a second specified weight that is larger than the first specified weight; and an effluent stream to remove the first specified portion and/or the second specified portion of the biologically-active bioaggregate granules from the reaction vessel.

16. The system of claim 15, wherein the agitator is configured to apply a shear force to the mixture of from about 0.005 Newtons per square meter to about 0.15 Newtons per square meter during the specified time period.

17. The system of claim 15, wherein the photogranule selector removes the first specified portion of the biologically-active bioaggregate granules and/or the second specified portion of the biologically-active bioaggregate granules by hydraulic selective pressure.

18. The system of claim 15, further comprising a clarifying unit configured to settle the first specified portion of the biologically-active bioaggregate granules and/or the second specified portion of the biologically-active bioaggregate granules for a specified settling time.

19. The system of claim 15, wherein the specified luminous flux is defined as a photosynthetic photon flux density onto the mixture in the reaction vessel from about 30 $\mu$mol m$^{-2}$ s$^{-1}$ to about 1200 $\mu$mol m$^{-2}$ s$^{-1}$.

20. The system of claim 15, wherein the intermittent illumination comprises sunlight, the system further comprising a filter for modulating the sunlight so that a photosynthetic photon flux density onto the mixture in the reaction vessel is 1200 $\mu$mol m$^{-2}$ s$^{-1}$ or less and to reduce ultraviolet light from the sunlight that is incident onto the mixture.

21. The system of claim 15, further comprising a gas diffuser to add at least one of: carbon dioxide, oxygen, and air to the mixture.

* * * * *